United States Patent
Chen (10) Patent No.: US 9,480,098 B2
(45) Date of Patent: Oct. 25, 2016

(54) HANDLING RADIO RESOURCE CONTROL CONNECTION RECONFIGURATION AND RELATED COMMUNICATION DEVICE

(75) Inventor: Te-Ming Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 117 days.

(21) Appl. No.: 13/210,367

(22) Filed: Aug. 15, 2011

(65) Prior Publication Data

US 2012/0040677 A1    Feb. 16, 2012

Related U.S. Application Data (60) Provisional application No. 61/374,233, filed on Aug. 16, 2010.

(51) Int. Cl.
*H04W 36/00*    (2009.01)
*H04W 76/04*    (2009.01)
*H04W 76/02*    (2009.01)

(52) U.S. Cl.
CPC .......... *H04W 76/04* (2013.01); *H04W 76/028* (2013.01); *H04W 76/046* (2013.01)

(58) Field of Classification Search
CPC .............................. H04W 36/30; H04W 36/18
USPC .................. 455/436, 450, 437, 438; 370/311
See application file for complete search history.

(56) References Cited

U.S. PATENT DOCUMENTS

| | | | |
|---|---|---|---|
| 2008/0305797 A1* | 12/2008 | Somasundaram et al. ... | 455/436 |
| 2010/0035599 A1 | 2/2010 | Chen | |
| 2010/0304748 A1* | 12/2010 | Henttonen et al. ........... | 455/436 |
| 2012/0314635 A1* | 12/2012 | Lee ......................... | H04L 5/001 370/311 |

FOREIGN PATENT DOCUMENTS

WO    2008151243 A2    12/2008

OTHER PUBLICATIONS

3GPP TSG-RAN WG2 Meeting #70bis; R2-104195, Jun. 28, 2010 Nokia.*
Ericsson, "RRC Connection Reconfiguration failure", 3GPP TSG-RAN WG2 62bis, R2-083183, Jun. 30-Jul. 4, 2008, Warsaw, Poland, XP050140612, p. 1-8. Ericsson.*
European patent application No. 11006688.3, European Search Report mailing date: Nov. 30, 2011.
Ericsson, "RRC Connection Reconfiguration failure", 3GPP TSG-RAN WG2 62bis, R2-083183 , Jun. 30-Jul. 4, 2008, Warsaw, Poland, XP050140612, p. 1-8.
3GPP TS 36.331 V9.3.0 (Jun. 2010) Technical Specification 3rd Generation Partnership Project; Technical Specification Group Radio Access Network; Evolved Universal Terrestrial Radio Access (E-UTRA); Radio Resource Control (RRC); Protocol specification (Release 9).
3GPP TSG-RAN WG2 Meeting #72; R2-106856, Nov. 15, 2010.
3GPP TSG-RAN WG2 Meeting #70bis; R2-104195, Jun. 28, 2010.

(Continued)

*Primary Examiner* — Chuck Huynh
(74) *Attorney, Agent, or Firm* — Winston Hsu; Scott Margo (57) ABSTRACT

A method of handling RRC connection reconfiguration for a mobile device in a wireless communication system is disclosed. The mobile device has a RRC connection. The method comprises receiving a first configuration in an RRC message from a network, wherein the first configuration is used for a first secondary cell; ignoring the first configuration when the mobile device is unable to comply with all of the first configuration; and maintaining the RRC connection.

11 Claims, 6 Drawing Sheets

(56) References Cited

OTHER PUBLICATIONS

3GPP, "LTE; Evolved Universal Terrestrial Radio Access (E-UTRA); Radio Resource Control (RRC); Protocol specification (3GPP TS 36.331 version 9.2.0 Release 9)", ETSI TS 136 331 V9.2.0, 3GPP Technical Specification, Apr. 2010, p. 165,178.
Office action mailed on Mar. 18, 2014 for the Taiwan application No. 100129258, filing date: Aug. 16, 2011, p. 1-8.
Nokia Siemens Networks (Rapporteur), "Stage 2 description of Carrier Aggregation", 3GPP TSG-RAN WG2 Meeting #69, R2-102645, Beijing, China, Apr. 12-16, 2010.
ZTE, "RLF and Re-establishment in carrier aggregation", 3GPP TSG RAN WG2 #67bis, R2-095669, Oct. 12-16, Miyazaki, Japan, Oct. 12, 2009.
Office action mailed on May 20, 2014 for the China application No. 201110235355.5, filing date: Aug. 16, 2011.

\* cited by examiner

HANDLING RADIO RESOURCE CONTROL CONNECTION RECONFIGURATION AND RELATED COMMUNICATION DEVICE

CROSS REFERENCE TO RELATED APPLICATIONS

This application claims the benefit of U.S. Provisional Application No. 61/374,233 filed on Aug. 16, 2010 and entitled "UE behaviours for RRC Connection Reconfiguration with Scell change", the contents of which are incorporated herein.

BACKGROUND OF THE INVENTION

1. Field of the Invention

The application relates to a method and a related communication device used in a wireless communication system and related communication device, and more particularly, to a method of handling radio resource control (RRC) connection reconfiguration and a related communication device in a wireless communication system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as to user equipments (UEs).

In the LTE system defined by 3GPP, the logical connection between the UE and the E-UTRAN is defined by radio resource control (RRC) connection states. The RRC states of the UE contain an RRC_IDLE state and an RRC_CONNECTED state. Mobility control in RRC_IDLE is UE-controlled (e.g. cell reselection) while in RRC_CONNECTED it is controlled by the E-UTRAN.

In RRC_CONNECTED, the E-UTRAN allocates radio resource to the UE to facilitate the transfer of (unicast) data via shared data channels. To support this operation, the UE monitors an associated control channel which is used to indicate the dynamic allocation of the shared transmission resources in time and frequency.

A RRC connection reconfiguration procedure is used to establish, modify or release radio bearers (e.g. DRBs (Data Radio Bearer)). In LTE, RRC connection reconfiguration also involves setting up a default EPS (Evolved Packet System) bearer between the UE and a core network (CN). This EPS bearer is set up on the basis of a non-guaranteed bit rate allowing the application-level signaling to take place as soon as a secure RRC connection is established.

In addition, the same RRC connection reconfiguration procedure is employed to perform handovers, NAS (Non-Access Stratum) message transfer and configuration of measurements. However, certain types of reconfiguration cannot be performed until the AS (Access Stratum) security has been activated. As a part of the RRC connection reconfiguration procedure, the E-UTRAN sends an RRC connection reconfiguration message with the appropriate information elements. Upon a successful handover, the UE responds with a message "RRC connection reconfiguration complete".

A long term evolution-advanced (LTE-A) system, as its name implies, is an evolution of the LTE system, considering relaying for cost-effective throughput enhancement and coverage extension. The LTE-A system includes all of the features of the LTE system and several new ones, the most important of which are: carrier aggregation (CA), enhanced multi-antenna support and relaying. The LTE system provides extensive support for deployment in spectrum allocations of various characteristics, with transmission bandwidths ranging from 1.4 MHz up to 20 MHz. In the LTE-A system, the transmission bandwidth can be further extended with carrier aggregation wherein multiple component carriers are aggregated and jointly used for transmission to/from a signal UE. In general, up to five component carriers can be aggregated, allowing for transmission bandwidth up to 100 MHz.

When CA is configured, the UE only has one RRC connection with the network. At RRC connection establishment/re-establishment, one serving cell provides the security input (one ECGI, one PCI and one ARFCN) and the NAS mobility information (e.g. TAI) similarly as in Rel-8/9 under 3GPP. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC). Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC). The configured set of serving cells for a UE therefore always consists of one PCell and one or more SCells.

The RRC connection re-establishment procedure will not be triggered by physical layer problem occurred in Scell. The Scells failure is handling by network, not by UEs. According to prior art, the network can obtain the RRC connection reconfiguration procedure to add/configure/release Scells. If a UE is unable comply with all the Scell configuration, e.g. adding a Scell, the UE will consider reconfiguration failure and perform RRC Connection re-establishment procedure. Nevertheless, it is not reasonable that the Scell failure result in the disconnection of Pcell.

In addition, the UE sets the reestablishmentCause to the value "reconfigurationFailure" while the re-establishment is resulting from the UE is unable to comply with the all the configurations included in the RRCConnectionReconfiguration message. After received the cause from a UE, the network cannot distinguish if the configuration failure is for PCell or SCell. The network may always consider the failure is for PCell configuration and adjust the PCell configuration. Nevertheless, if the configuration failure is for SCell, the UE will suffer the failure again. For example, the system information of SCell is control by the Scell. If the configuration failure is resulting from the UE is unable to comply with the SCell's system information. The configuration failure will be met again and again unless the network finds this.

SUMMARY OF THE INVENTION

A method of handling radio resource control (RRC) connection reconfiguration in a wireless communication system is provided.

A method of handling RRC connection reconfiguration for a mobile device in a wireless communication system is disclosed. The mobile device has a RRC connection. The method comprises receiving a first configuration in an RRC message from a network, wherein the first configuration is used for a first secondary cell; ignoring the first configuration when the mobile device is unable to comply with all of the first configuration; and maintaining the RRC connection.

A method of handling RRC connection reconfiguration for a mobile device in a wireless communication system is disclosed. The method comprises having an RRC connection re-establishment procedure according to a configuration failure of a secondary cell; and including a specific cause in an RRC message during the RRC connection re-establishment procedure to indicate the configuration failure of the secondary cell.

A method of handling RRC connection reconfiguration for a mobile device in a wireless communication system is disclosed. The method comprises having an RRC connection re-establishment procedure according to a configuration failure of a secondary cell; and setting a reestablishmentCause to a specific value and including a specific field in an RRC message, wherein the field indicates a configuration of which secondary cell the mobile device is not able to apply.

A communication device for handling RRC connection reconfiguration in a wireless communication system is disclosed. The communication device has an RRC connection. The communication device comprises means for receiving a first configuration in an RRC message from a network, wherein the first configuration is used for a first secondary cell; means for ignoring the first configuration when the mobile device is unable to comply with all of the first configuration; and means for maintaining the RRC connection.

A communication device for handling RRC connection reconfiguration in a wireless communication system is disclosed. The communication device comprises means for having an RRC connection re-establishment procedure according to a configuration failure of a secondary cell; and means for including a specific cause in an RRC message during the RRC connection re-establishment procedure to indicate the configuration failure of the secondary cell.

A communication device for handling RRC connection reconfiguration in a wireless communication system is disclosed. The communication device comprises means for having an RRC connection re-establishment procedure according to a configuration failure of a secondary cell; and means for setting a reestablishmentCause to a specific value and including a specific field in an RRC message, wherein the field indicates a configuration of which secondary cell the mobile device is not able to apply.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
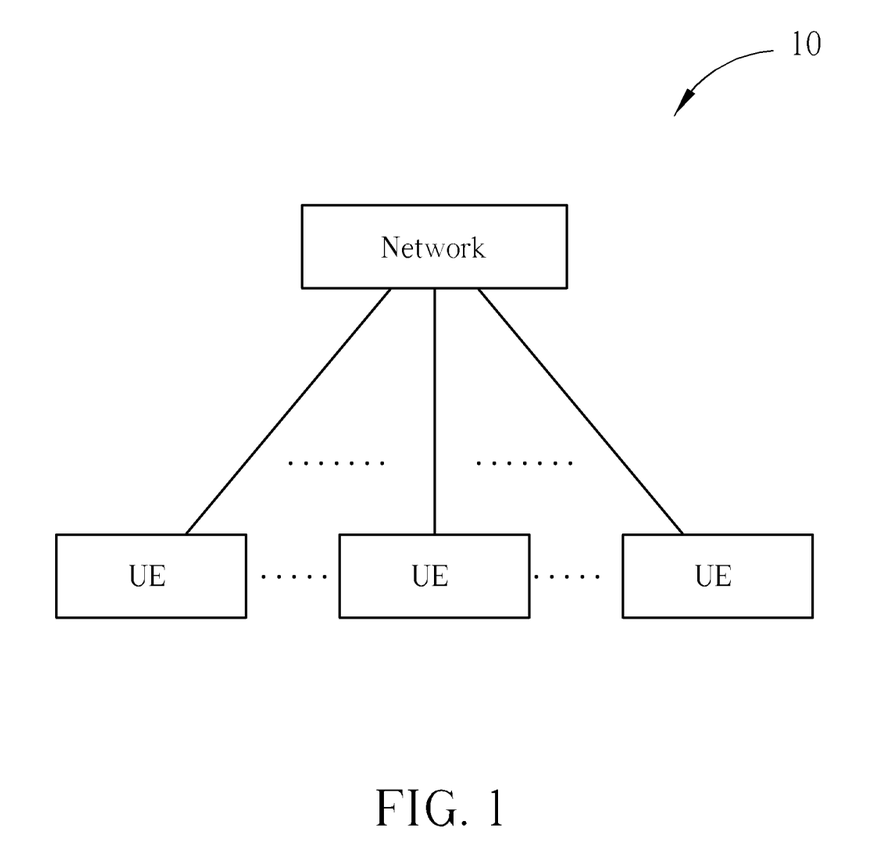
FIG. 1 is a schematic diagram of an exemplary wireless communication system.

Please refer to FIG. 1, FIG. 1 is a schematic diagram of an exemplary wireless communication system 10. The wireless communication system 10 can be an LTE-Advanced system, or other mobile communication systems (e.g. LTE, WCDMA, HSPA, GSM, EDGE, etc.). The wireless communication system 10 is briefly composed of a network and a plurality of user equipments (UEs), as the structure illustrated in FIG. 1. In the LTE-Advanced system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
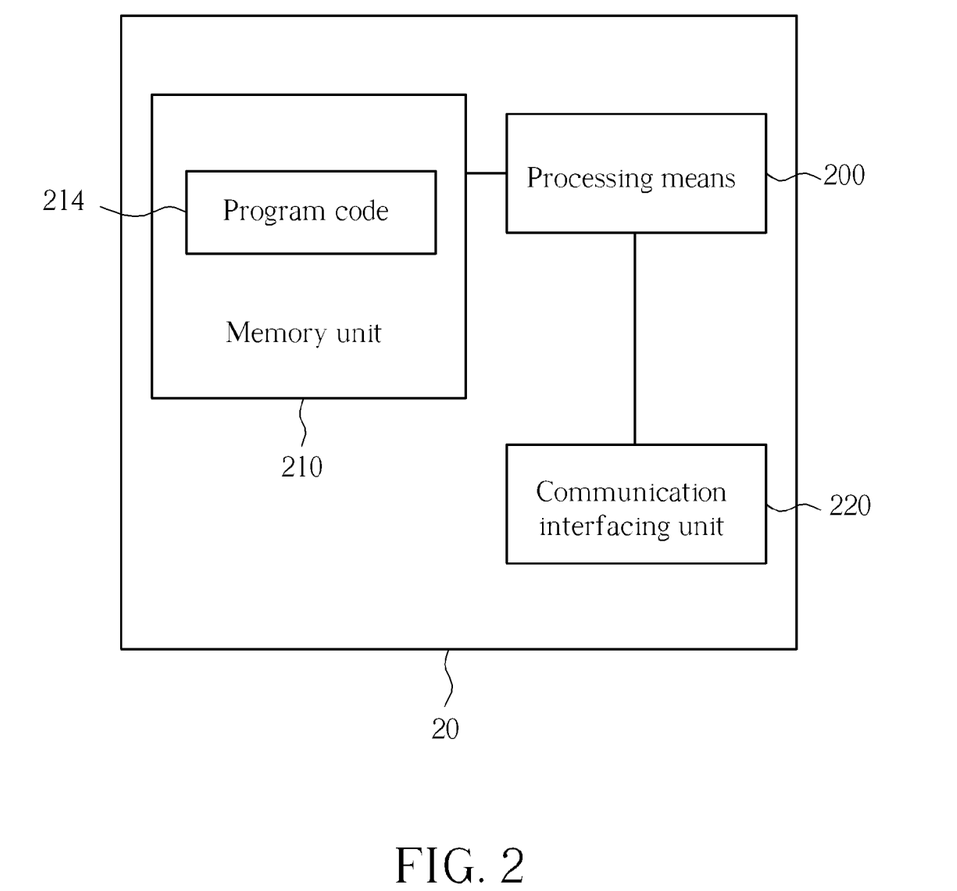
FIG. 2 is a schematic diagram of an exemplary communication device.

Please refer to FIG. 2, FIG. 2 is a schematic diagram of an exemplary communication device 20. The communication device 20 can be the UE or the network shown in FIG. 1 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), random-access memory (RAM), CD-ROMs, magnetic tapes, floppy disks, and optical data storage devices. The communication interfacing unit 220 is preferably a radio transceiver for wirelessly communicating with the network according to processing results of the processing means 200.

Figure 3:
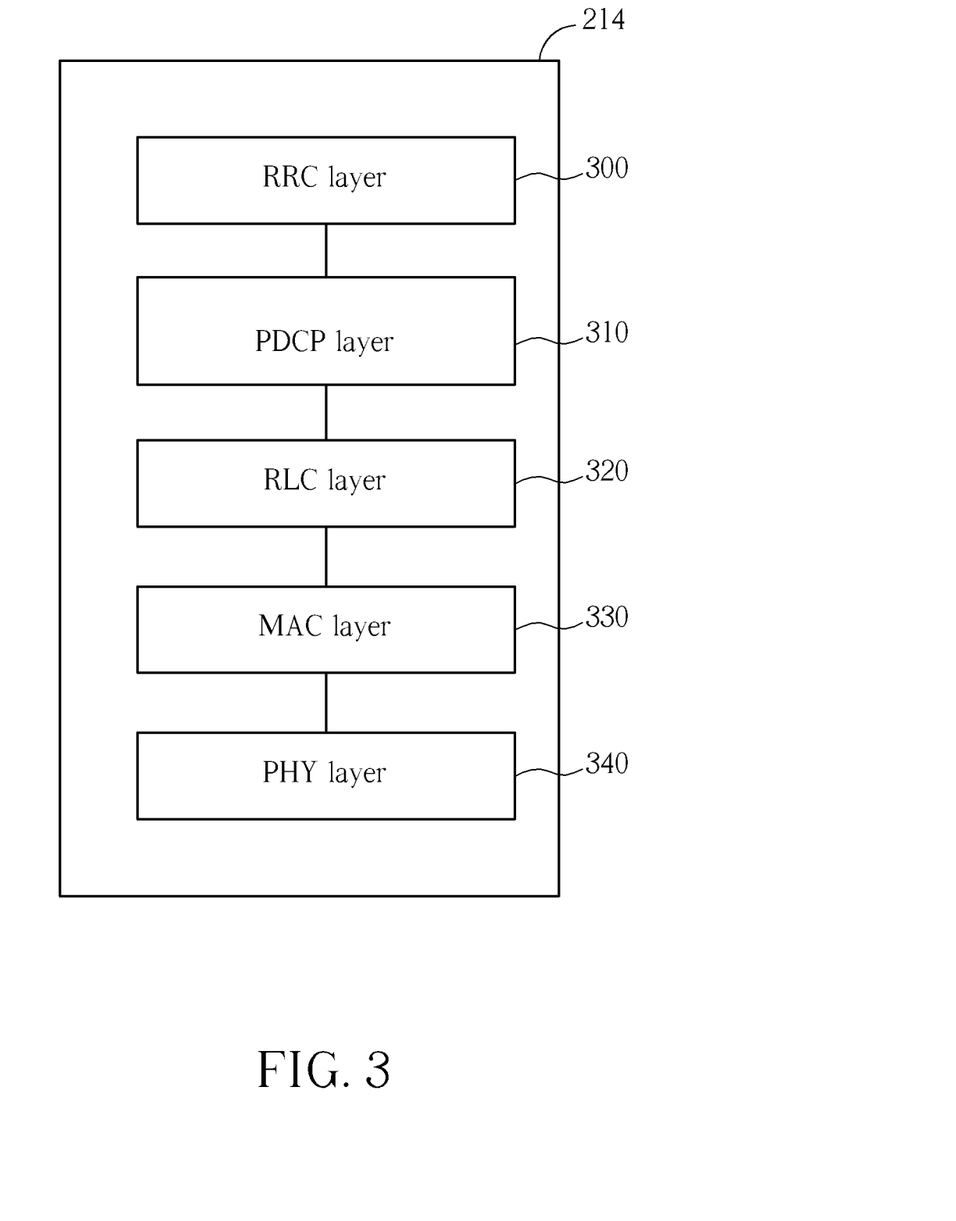
FIG. 3 illustrates the program code in FIG. 2.

Please refer to FIG. 3, which illustrates the program code 214 in FIG. 2. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340.

The RRC layer 300 communicates with the NAS layer 350 for transfer of common NAS information and dedicated NAS information. The RRC layer 300 cover all procedures related to the establishment, modification and release of an RRC connection, including paging, initial security activation, establishment of Signalling Radio Bearers (SRBs) and of radio bearers carrying user data (Data Radio Bearers, DRBs), handover within LTE (including transfer of UE RRC context information), configuration of the lower protocol layers, access class barring and radio link failure.

At RRC connection establishment/re-establishment, one serving cell provides the security input (one ECGI, one PCI and one ARFCN) and the NAS (non-access mobility information (e.g. TAI) similarly as in Rel-8/9 under 3GPP. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC). Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC). The configured set of serving cells for a UE therefore always consists of one PCell and one or more SCells.

Figure 4:
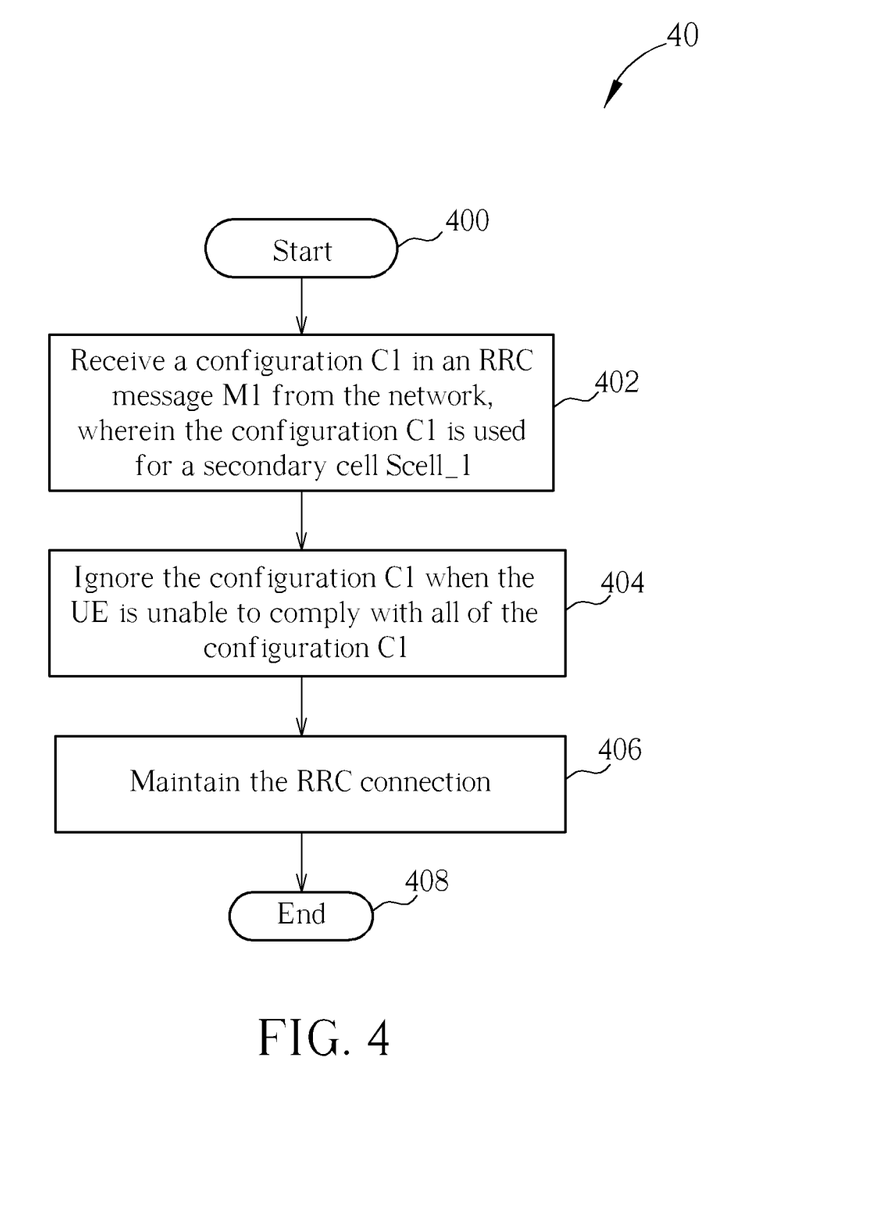
FIG. 4 is a flow chart of an exemplary process.

Please refer to FIG. 4, which is a flow chart of an exemplary process 40. The process 40 is used for handling RRC connection reconfiguration for a UE in a wireless communication system. The UE has a RRC connection. The wireless communication system could be the wireless communication system 10. The process 40 can be compiled into the program code 214 and includes the following steps:

Step 400: Start.

Step 402: Receive a configuration C1 in an RRC message M1 from the network, wherein the configuration C1 is used for a secondary cell Scell_1.

Step 404: Ignore the configuration C1 when the UE is unable to comply with all of the configuration C1.

Step 406: Maintain the RRC connection.

Step 408: End.

According to the process 40, the UE having the RRC connection receives the configuration C1 in the RRC message M1. Preferably, the RRC message M1 is an RRCConnectionReconfiguration message. The RRC message M1 includes the configuration C1 of the secondary cell Scell_1. When the UE is unable to comply with all of the configuration C1, the UE ignores the configuration C1 and maintains the RRC connection. The UE keeps the original RRC connection. The UE neither performs an RRC connection re-establishment procedure nor enters an idle mode.

In addition, the UE sends a message M2 to inform the network that the UE is unable to comply with the configuration C1. Preferably, the message M2 is preferably an RRCConnectionReconfigurationComplete message or an RRCConnectionReconfigurationFailure message. Further, the message M2 may include a field F to inform the network that the UE is unable to comply with the configuration C1.

The UE may receive one or more configurations in the RRC message M1. For example, the UE receives another configuration C2 in the RRC message M1. The configuration C2 is used for a secondary cell Scell_2 other than the secondary cell Scell_1. The UE may be able to comply with the configuration C2. In some examples, the UE apply the configuration C2 when the UE receives configuration C2 in the RRC message M1. When the UE is unable to comply with the configuration C1 but is able to comply with the configuration C2 the UE still applies the configuration C2 of the secondary cell Scell_2. In some examples, the UE may ignore the configuration C2 even if the UE is able to comply with the configuration C2.

If the network includes configurations C1, C2 and C3 of the secondary cells Scell_1, Scell_2 and Scell_3, respectively. If the UE is unable to comply with the configurations C1 and C2 of the secondary cells Scell_1 and Scell_2 but the UE is able to comply with the configuration C3 of the secondary cell Scell_3, the UE informs the network that reconfiguration failure is resulting from the secondary cells Scell_1 and Scell_2.

In addition, the UE may distinguish the secondary cells using at least one of a PCI (physical cell identity) value, frequency, ServCellIndex, and CGI (Cell Global Identification) value. For example, the UE indicating the configuration failure of the secondary cell SCell_1 by a PCI (physical cell identity) value of the secondary cell Scell_1/frequency of the secondary cell Scell_1/ServCellIndex of the secondary cell Scell_1/CGI (Cell Global Identification) value of the secondary cell Scell_1.

Figure 5:
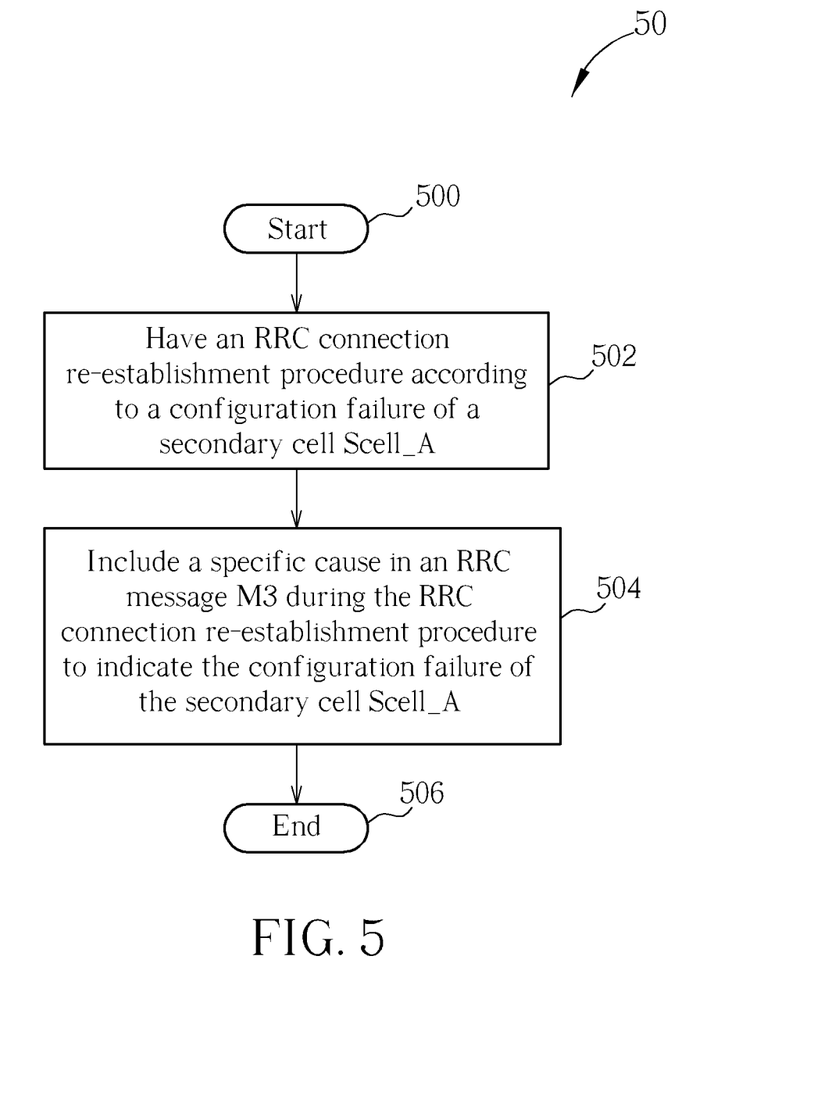
FIG. 5 is a flow chart of an exemplary process.

Please refer to FIG. 5, which is a flow chart of an exemplary process 50. The process 50 is used for handling RRC connection reconfiguration for a UE in a wireless communication system. The wireless communication system could be the wireless communication system 10. The process 50 can be compiled into the program code 214 and includes the following steps:

Step 500: Start.

Step 502: Have an RRC connection re-establishment procedure according to a configuration failure of a secondary cell Scell_A.

Step 504: Include a specific cause in an RRC message M3 during the RRC connection re-establishment procedure to indicate the configuration failure of the secondary cell Scell_A.

Step 506: End.

According to the process 50, the UE includes the specific cause in the RRC message M3 to indicate a Scell configuration failure when the UE has the RRC connection re-establishment procedure. The RRC connection re-establishment procedure is caused by the configuration failure of the secondary cell Scell_A. Preferably, the message M3 is an RRCConnectionReestablishmentRequest message. The specific cause can be "SCellConfigurationFailure". That is, the UE include the cause "SCellConfigurationFailure" in the RRCConnectionReestablishmentRequest message when the UE has the RRC connection re-establishment procedure. Since the specific cause is included in the RRC message M3, the network can know the configuration failure comes from the secondary cell Scell_A after receiving the specific cause.

In addition, the RRC message M3 includes a field F2 to indicate the configuration of which secondary cell the UE can not apply. For example, the network may include two other configurations of secondary cells Scell_B and Scell_C. If the UE is unable to comply with the configurations of the secondary cells Scell_A and Scell_B but is able to comply with the configuration of the Scell_C, the UE informs the network the reconfiguration failure is resulting from the secondary cells Scell_A and ScellB.

The UE may distinguish the secondary cells using PCI/frequency/ServCellIndex/CGI value. For example, the UE indicates the configuration failure of the secondary cell SCell_A by a PCI value of the secondary cell Scell_A/frequency of the secondary cell Scell_A/ServCellIndex of the secondary cell Scell_A/CGI value of the secondary cell Scell_A.

Figure 6:
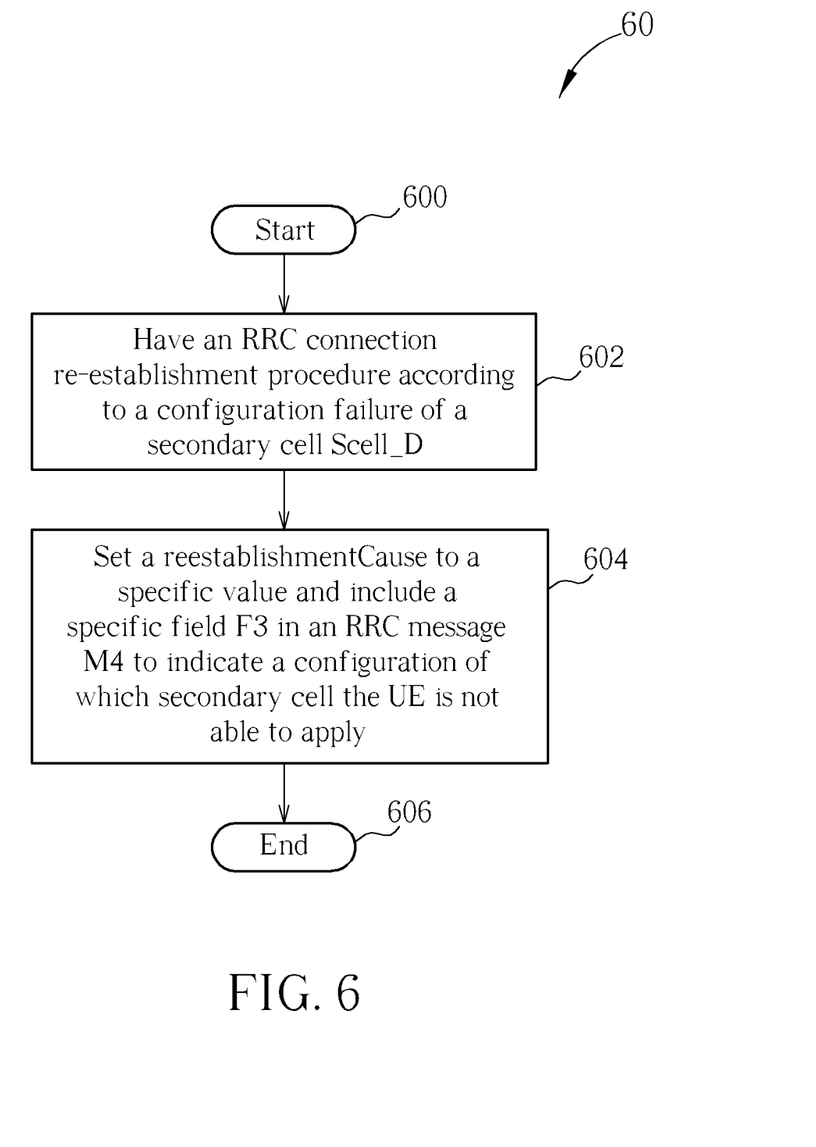
FIG. 6 is a flow chart of an exemplary process.

Please refer to FIG. 6, which is a flow chart of an exemplary process 60. The process 60 is used for handling RRC connection reconfiguration for a UE in a wireless communication system. The wireless communication system could be the wireless communication system 10. The process 60 can be compiled into the program code 214 and includes the following steps:

Step 600: Start.

Step 602: Have an RRC connection re-establishment procedure according to a configuration failure of a secondary cell Scell_D.

Step 604: Set a reestablishmentCause to a specific value and include a specific field F3 in an RRC message M4 to indicate a configuration of which secondary cell the UE is not able to apply.

Step 606: End.

According to the process 60, the UE sets the reestablishmentCause to the specific value and include the specific field F3 in the RRC message M4 to indicate a configuration of which secondary cell the UE is not able to apply. The RRC connection re-establishment procedure is caused by the configuration failure of the secondary cell Scell_D. Preferably, the message M4 is an RRCConnectionReestablishmentRequest message. The specific value can be "reconfigurationFailure". That is, the UE sets the reestablishmentCause to the value "reconfigurationFailure" and includes the filed F3 in the RRCConnectionReestablishmentRequest message to specify the re-establishment procedure is resulting from the configuration failure of the secondary cell Scell_D. Since the reestablishmentCause is set to the specific value, the network can know the configuration failure comes from the secondary cell Scell_D after receiving the RRC message M4.

The network may include two other configurations of secondary cells Scell_E and Scell_F. If a UE is unable to comply with the configurations of the secondary cells SCell_D and Scell_E but is able to comply with the configuration of the secondary cell SCell_F, the UE informs network the reconfiguration failure is resulting from the secondary cells SCe11_D and Scell_E.

The UE may distinguish the secondary cells using PCI/frequency/ServCellIndex/CGI value. For example, the UE indicates the configuration failure of the secondary cell SCell_D by a PCI value of the secondary cell Scell_D/frequency of the secondary cell Scell_D/ServCellIndex of the secondary cell Scell_D/CGI value of the secondary cell Scell_D.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can handling RRC connection reconfiguration in the wireless communications system 10.

To sum up, when the UE with the RRC connection is unable to comply with all of the configuration of the secondary cell the UE ignores the configuration of the secondary cell and maintain the RRC connection. When the RRC connection re-establishment procedure is resulting from the secondary cell configuration failure, the UE should include a specific cause in the RRCConnectionReestablishmentRequest message to indicate the secondary cell configuration failure or set the reestablishmentCause to the value "reconfigurationFailure" and includes the specific field in the RCConnectionReestablishmentRequest message. Consequently, the network can know the configuration failure comes from the secondary cell after receiving the specific cause or the specific field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling radio resource control (RRC) connection reconfiguration for a mobile device in a long term evolution-advanced (LTE-A) system, the method comprising:
   being configured with carrier aggregation and having an RRC connection with a primary cell;
   receiving a first configuration in an RRC message from a network of the LTE-A system, wherein the first configuration is used for configuring a first secondary cell to be part of a set of serving cells which comprises the primary cell;
   when the mobile device is unable to comply with all of the first configuration, not applying the first configuration;
   when the mobile device is unable to comply with all of the first configuration, still maintaining the RRC connection with the primary cell without performing an RRC Connection re-establishment procedure; and
   when the mobile device is able to comply with all of the first configuration, applying the first configuration to configure the first secondary cell as part of the set of serving cells.

2. The method of claim 1 further comprising neither performing an RRC connection re-establishment procedure nor entering an idle mode.

3. The method of claim 1 further comprising sending a message to inform a network that the mobile device is unable to comply with all of the first configuration for the first secondary cell.

4. The method of claim 3, wherein the message includes a field, the field indicates that the mobile device is unable to comply with all of the first configuration for the first secondary cell.

5. The method of claim 1 further comprising:
   receiving a second configuration in the RRC message, wherein the second configuration is used for a second secondary cell other than the first secondary cell; and
   applying the second configuration and connecting to the primary cell and the second secondary cell when the mobile device is able to comply with the second configuration.

6. The method of claim 1 further comprising:
   receiving a second configuration in the RRC message, wherein the second configuration is used for a second secondary cell other than the first secondary cell; and
   not applying the second configuration even if the mobile device is able to comply with the second configuration.

7. The method of claim 5 further comprising sending a message to inform a network that the mobile device is unable to comply with all of the first configuration for the first secondary cell, wherein the message is further used for informing the network that the mobile device applies the second configuration.

8. The method of claim 4 further comprising indicating the first secondary cell by at least one of a PCI (physical cell identity) value, frequency, ServCellIndex, and CGI (Cell Global Identification) value.

9. A method of handling radio resource control (RRC) connection reconfiguration for a mobile device in a long term evolution-advanced (LTE-A) system, the method comprising:
   being configured with carrier aggregation and having an RRC connection with a primary cell;
   receiving a plurality of configurations in a first RRC message from a network of the LTE-A system, wherein each of the configurations is used for configuring a respective secondary cell to be part of a set of serving cells which comprises the primary cell;
   having an RRC connection re-establishment procedure with the primary cell after the mobile device is not able to apply any of the configurations; and
   including a specific field in an RRCConnectionReestablishmentRequest message and sending the RRCConnectionReestablishmentRequest message to the network, wherein the specific field indicates the configuration of which secondary cell the mobile device is not able to apply to prevent the secondary cell indicated from being added for usage with the primary cell.

10. The method of claim 9, wherein a reestablishmentCause is set to a specific value in the RRCConnectionReestablishmentRequest message and the specific value is reconfigurationFailure.

11. The method of claim 9, wherein the specific field indicates the at least one secondary cell by at least one of a PCI (physical cell identity) value, frequency, ServCellIndex, and CGI (Cell Global Identification) value.

* * * * *